Figure 1:
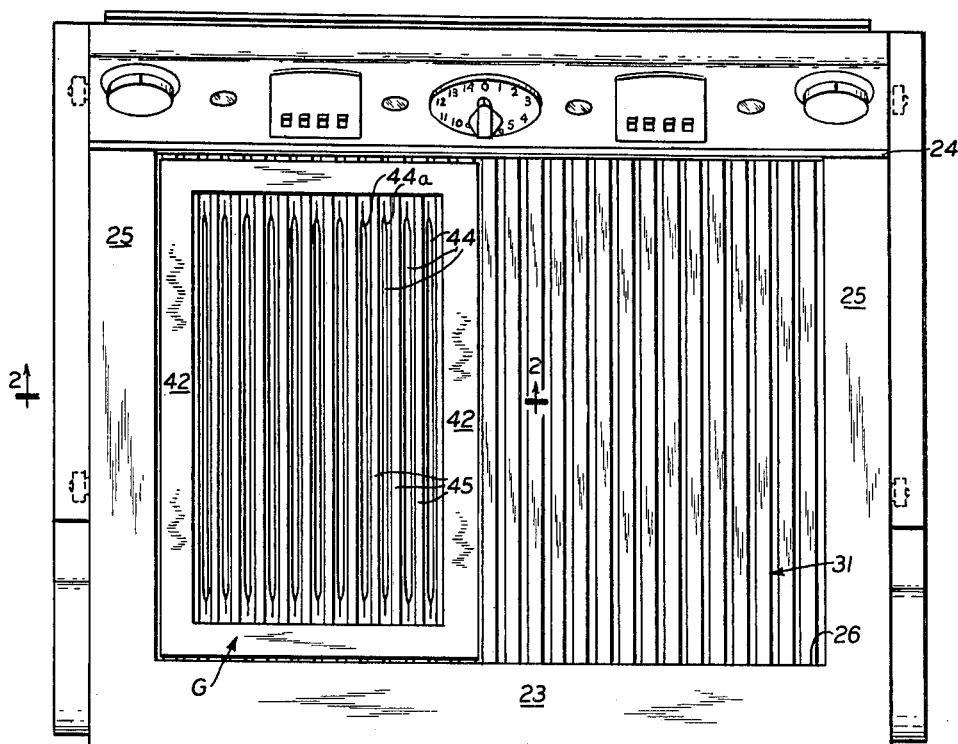

Dec. 28, 1965    J. SAVIO    3,225,682
GRIDDLE PLATE
Original Filed Sept. 12, 1960

INVENTOR
JOSEPH SAVIO
BY
Blum, Moscovitz, Friedman & Blum
ATTORNEYS.

United States Patent Office 3,225,682
Patented Dec. 28, 1965

3,225,682
GRIDDLE PLATE
Joseph Savio, Floral Park, N.Y., assignor to Electro-Char Corporation, New York, N.Y., a corporation of New York
Continuation of application Ser. No. 55,486, Sept. 12, 1960. This application Oct. 26, 1962, Ser. No. 233,472
1 Claim. (Cl. 99—446)

This invention relates to an improved griddle plate for use directly upon the heating elements of electric cooking apparatus.

This application is a continuation of my prior application Serial No. 55,486, filed September 12, 1960, for Griddle Plate, now abandoned.

This invention is an improvement over my prior U.S. Patent No. 2,938,102. In that patent I disclosed an electrified cooking grate comprising a frame having a central opening with opposed end walls each having a plurality of spaced apertures. As further disclosed in that patent, a plurality of parallel heating elements each comprising a generally straight hollow metal tube containing a wire extended between the end walls and into the apertures thereof. Said tubes were sealed within the apertures against the passage of grease, liquids, and the like. In said prior patent, in one embodiment thereof, a heat conducting griddle plate rested upon the upper surfaces of the tubes. It was found that the use of the griddle plate greatly reduced the variations in heat of the tubes, because the griddle plate blocked off air circulation past the tubes and also served as a large metal mass to store a large quantity of heat.

An important object of this invention is to provide an electrified cooking grate having the advantages of the electrified cooking grate shown in my aforesaid prior U.S. Patent No. 2,938,102, and to utilize an improved griddle plate in conjunction with said electrified cooking grate.

An important object of this invention is to provide an improved griddle plate, for use in conjunction with said electrified cooking grate, which has means for the discharge of grease and fats into the space between the tubes, and down to the cool zone below said tubes, to prevent the accumulation of such fat or grease upon the surface of the griddle plate, and also to permit their discharge to the cool zone and thereby prevent spattering or flaming of the fat or grease.

Another object of the invention is to provide an improvide griddle plate, as above described, having means for controlling the discharge of such fat and grease so that they do not come into contact with the electrified heating tubes.

Another important object of this invention is to provide an improved griddle plate which will minimize the risk of fat or liquid flowing along the tube to the end wall apertures, thereby making it possible to use a less expensive sealing means for said apertures than was required in my prior patents, and in some instances even to eliminate the sealing means almost altogether.

It will be apparent that as important advantages of my improved construction, a less costly tube construction can be used since the tube is shielded from the corrosive food products, liquid fats can drain below the tubes to the receptacle in the cool zone below, and food to be cooked rests directly upon metal which is heated by the electrical resistant units.

Other objects and advantages will become apparent from the following description, in conjunction with the annexed drawing, in which a preferred embodiment of the invention is disclosed.

In the drawing, FIG. 1 is a top plan view of a preferred embodiment of the invention.

Figure 2:
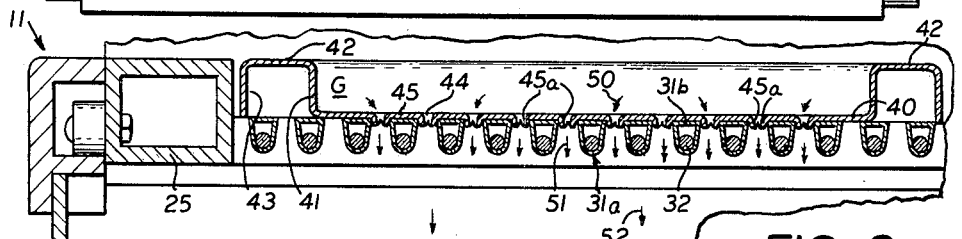
Figure 2:
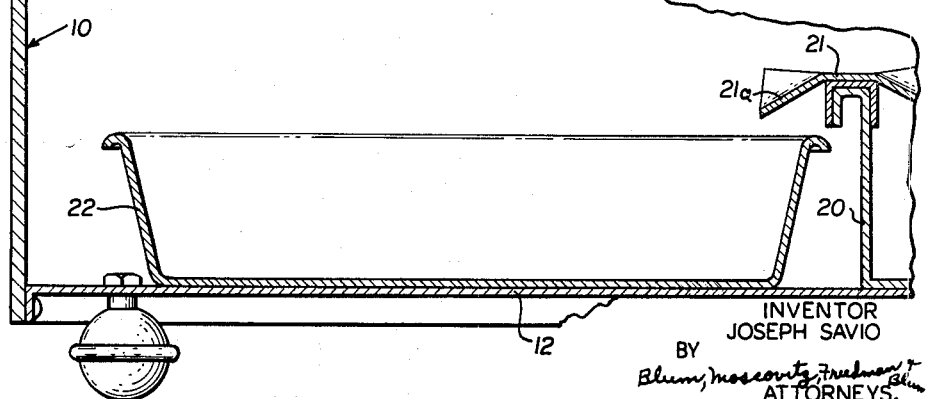

FIG. 2 is a section on line 2—2 of FIG. 1, and is partly broken away.

On reference to the drawing in detail, it will be noted that it shows a cooking device of generally rectangular shape and having a base frame 10 and a top frame 11 removably mounted upon said base frame 10. The heating and electrical elements of the stove are preferably mounted upon the removable top frame 11, with the base frame 10 serving as a support and also serving to hold drip pans.

The said structure of base frame 10 and of top frame 11 may be of any suitable type, and reference is made to my aforesaid prior patent to complete the disclosure herein.

Longitudinal partition wall 20 is mounted on the bottom 12 of base frame 10 by any suitable means. A deflector 21 is optionally and preferably mounted upon the upper end of partition wall 20, and is substantially coextensive therewith. The side portions 21a of deflector 21 are optionally downwardly and outwardly inclined.

A pair of generally rectangular drip pans 22, having open tops, may be releasably placed upon the bottom wall 12 on opposite sides of partition 20, with the deflector portions 21a extending outwardly of the proximate sides of the pans 22. As a result, drippings from the top heating elements either fall directly into the drip pans 22 or are deflected therein by deflector 21.

The top frame member 11 is generally rectangular in shape and has front and rear cross pieces 23 and 24, as well as longitudinal side arms or pieces 25. These elements cooperate to define a frame having a central opening 26. Said members 23, 24, 25 may be of any suitable rigid construction and are optionally of hollow rectangular shape, as shown illustratively with reference to member 25 in FIG. 2.

Any suitable means for mounting frame 11 movably with respect to frame 10 may be provided, and are disclosed in my aforesaid prior patent.

A plurality of elongated, optionally straight electric heating grate tube elements 31 are mounted on frame 11. These heating elements 31 are laterally spaced from each other and extend longitudinally. Said heating elements 31 are made of conventional components. Thus, each heating element 31 optionally and preferably has a hollow casing 31a which has a flat upper face or wall 31b and is otherwise convex in cross section. Heating wire 32 extends through said casing 31a.

Said heating elements 31 extend into openings in the respective hollow front and rear frame walls 23 and 24. Such openings may be formed in any suitable way, and this construction is fully shown in my aforesaid prior patent. Since the means for sealing the tubes in said end walls 23 and 24 are shown in my prior patent, and in fact, may optionally be dispensed with in the present construction, such sealing means are not shown.

Any suitable control means for controlling the flow of electricity through the wires 32 may be employed, and said control means are not described since they are fully disclosed in any aforesaid prior patent.

A metal griddle plate G may be placed directly upon the metal heating elements 31 of the stove. Said griddle plate G preferably extends substantially the entire length of the opening 26 and may extend any suitable proportion of the width thereof. Optionally, but without limitation thereto, the griddle plate G takes up approximately one half the width of opening 26. This makes it possible to cook certain foods, such as hamburgers, directly upon the exposed elements 31 on the right side of the stove, and to cook other food, such as eggs, upon griddle plate G on the left side.

The improvements of this invention over my aforesaid prior patent reside in the construction of said griddle plate G.

Said griddle plate G may be formed from standard sheet metal or in any suitable way. Said griddle plate G has a central, depressed, rectangular plate portion 40. Upstanding flange 41 extends around the periphery of plate 40, said flange 41 defining with plate 40 a well. The upper edge of flange 41 connects with an outwardly extending, circumferential peripheral flange 42. The outer edge of flange 42 connects with a downwardly extending, circumferential peripheral flange 43.

Accordingly, said flanges 41, 42 and 43 define a channel of inverted U-shape for strengthening the structure and preventing it from buckling or warping, as well as providing the aforesaid well.

A plurality of longitudinally extending slots 44 are struck in plate portion 40 of griddle G. The sides of said slots are struck downwardly at an angle and are represented by the reference numeral 45a. A plurality of strips 45 are defined between the respective successive slots 44. Accordingly, it will be appreciated that the formation of the slots 44 results in the formation of hoods, each of which consists of a strip 45 and the bent down flanges 45a on each side thereof, these hoods extending longitudinally. The underside of each hood 45, 45a is shaped and sized for reception of a respective tube casing 31a. In other words, the flat portion 31b of each tube casing fits flush against the underside of strip 45, with the flanges 45a extending downwardly on each side of each tube, adjacent the respective side edges of the flat top 31b. The actual slot 44 is spaced about halfway between the peripheral portions of succesive tube casings 31a.

The strips 45 are in one to one relationship to the tube casing 31a, so that each tube casing 31a is nestingly received within a respective strip 45 and its associated flanges 45a.

Preferably, each slot 44 terminates somewhat short of the respective ends of plate 40 so as to be spaced from the end portions of flange 41. Preferably, the end portion 44a of each slot 44 is tapered and meets more or less at a point. Beyond the slot end portion 44a, the flanges 45a more or less abut each other and are not bent downwardly and then eventually the cut ceases completely.

Since the strips 45 are in direct flush contact with the top tube casing portions 31b, there is excellent heat transfer between the tubes and the griddle, since no air is interposed between them. Furthermore, any grease from meat being cooked on top of the griddle moves downwardly in the direction of arrow 50, goes through a slot 44 in the direction of arrow 51 and drops downwardly in the direction of arrow 52, toward the tray or receptacle 22. Therefore, in this embodiment, the grease not only drops to a cool zone below the tubes, but completely avoids touching the tubes in any way. This makes it unnecessary to be as concerned as in my first patent with the problem of making the tubes of non-corrosive material. Furthermore, since the grease does not touch the tubes, the grease cannot travel by capillary action or other action along the top surfaces of the tubes to the ends thereof. This reduces or even eliminates the problem of sealing the ends of the tubes, in the apertures in the frame end walls, against the passage of grease and fats, since the grease and fats never reach the end of the tubes.

As a result of the foregoing, I not only achieve the advantage of a slotted plate for reception of meat to be cooked, but I shape the plate and arrange the slots so as to provide intimate metal contact between the griddle plate and the tubes of an electrified cooking grate, while at the same time locating the slots for passage of grease through the plate to the cool zone below the tubes but without the grease touching the tubes in any way.

It will be apparent that the invention is not limited to the precise shape of the tube casings shown in the drawing. For example, optionally, the heating tube casing may be substantially cylindrical in shape. The important considerations are that the tops of the tubes should be substantially coplanar, so as to support the griddle in intimate metal-to-metal contact therewith, and the flanges 45a should extend laterally beyond the periphery of the tube.

While I have disclosed a preferred embodiment of the invention, and have indicated various changes, omissions and additions which may be made therein, it will be apparent that various other changes, omissions and additions may be made in the invention without departing from the scope and spirit thereof.

What is claimed is:

Electrified cooking apparatus comprising a frame having opposed end walls, a plurality of heating elements each comprising a generally straight hollow metal tube containing a heating wire, said tubes extending longitudinally between said end walls and being extended supportedly through said end walls, said wires extending out of said tubes and being electrically inter-connected, said tubes being thus supported in spaced, generally parallel relationship, the upper surfaces of said tubes being flat and generally coplanar, and a unitary, heat conducting griddle plate removably positioned on said upper surfaces of said tubes, said griddle plate being shorter than the distance between said end walls and being divided by laterally spaced longitudinal slots into flat strips extending in the direction of length of and resting flush upon and of substantially the same width as and in one-to-one relation with said tube upper surfaces, each of said strips having flanges on each side thereof extending downwardly outwardly therefrom below the level of said top surface, said longitudinal slots terminating short of the respective ends of said plate, said plate also having an upstanding flange unitary therewith extending entirely around the periphery thereof.

References Cited by the Examiner

UNITED STATES PATENTS

| | | | |
|---|---|---|---|
| 2,723,617 | 11/1955 | Dreyfus | 99—444 |
| 2,856,502 | 10/1958 | Wolf | 99—445 X |
| 2,874,631 | 2/1959 | Cookesley | 99—400 |
| 2,940,381 | 6/1960 | Cottongim et al. | 99—445 |

ROBERT E. PULFREY, *Primary Examiner.*

GEORGE A. NINAS, Jr., WILLIAM B. PENN,
*Examiners.*